United States Patent [19]

Hiller

[11] Patent Number: 5,335,934
[45] Date of Patent: Aug. 9, 1994

[54] SPRING HANGER ASSEMBLY FOR TRAILER FRAME

[75] Inventor: James N. Hiller, Spokane, Wash.
[73] Assignee: EZ Loader Boat Trailers, Inc., Spokane, Wash.
[21] Appl. No.: 67,014
[22] Filed: May 26, 1993
[51] Int. Cl.⁵ ............................................. B60G 11/10
[52] U.S. Cl. ..................................... 280/718; 280/788; 280/686; 267/260
[58] Field of Search .............. 280/680, 686, 787, 788, 280/718; 267/44, 45, 260, 261

[56] References Cited

U.S. PATENT DOCUMENTS

| | | |
|---|---|---|
| 1,142,337 | 6/1915 | Layman . |
| 1,354,082 | 9/1920 | Westergard . |
| 1,619,609 | 3/1927 | Fejes . |
| 1,913,939 | 6/1933 | Miller et al. ................ 280/787 X |
| 2,101,545 | 12/1937 | Jacob ............................ 280/788 |
| 2,273,503 | 2/1942 | Couse . |
| 2,436,017 | 2/1942 | Powers . |
| 3,177,005 | 4/1965 | Duero . |
| 3,279,815 | 10/1966 | Hutchens . |
| 3,540,756 | 11/1970 | Stout ........................... 280/106.5 |
| 3,907,324 | 9/1975 | Mastin ........................... 280/680 |
| 4,095,818 | 6/1978 | Smith ............................ 280/789 |
| 4,412,690 | 11/1983 | Prokop et al. ................. 280/718 |
| 5,172,930 | 12/1992 | Boye et al. ................... 280/718 |

Primary Examiner—Margaret A. Focarino
Assistant Examiner—Carla Mattix
Attorney, Agent, or Firm—Harris Beach & Wilcox

[57] ABSTRACT

A trailer frame comprised of a tongue and longitudinal side frame members extending rearwardly from the tongue. The side frame members are formed of hollow tubing having top, bottom and side surfaces. Cross bar members are positioned between the longitudinal side frame members. An axle for mounting wheels and tires is also provided. A pair of fenders with mounting straps provide cover for the top portion of each of the tires and a pair of leaf springs is provided to suspend the axle from the trailer frame. The center portion of each of the springs is mounted to one end of the axle. Openings associated with each spring are formed in the bottom surface of each side frame member to allow the end portions of the leaf springs to be positioned within the interior of the tubing. Loops are formed at the ends of each leaf spring. Two bolts associated with each spring are horizontally positioned through the side surfaces of the side frame members above the openings. Each of the bolts support a spacer and a bushing that are contained within the interior of the tubing. The two bolts, spacers, and bushings pass through the spring loops to support the ends of the spring within the interior of the tubing. The heads of the bolts also support the mounting straps of the fenders against the outer side surface of the side frame members.

7 Claims, 2 Drawing Sheets

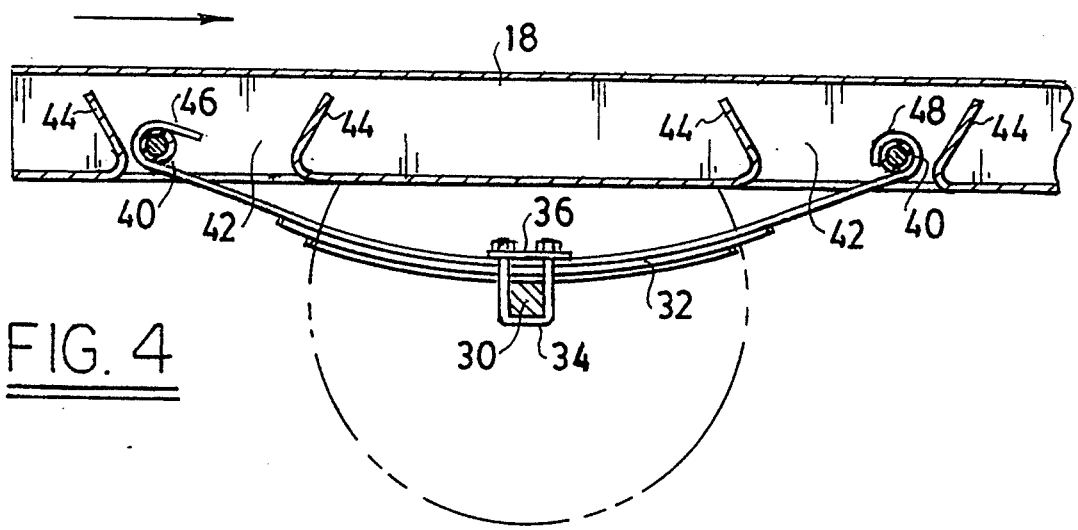
FIG. 4
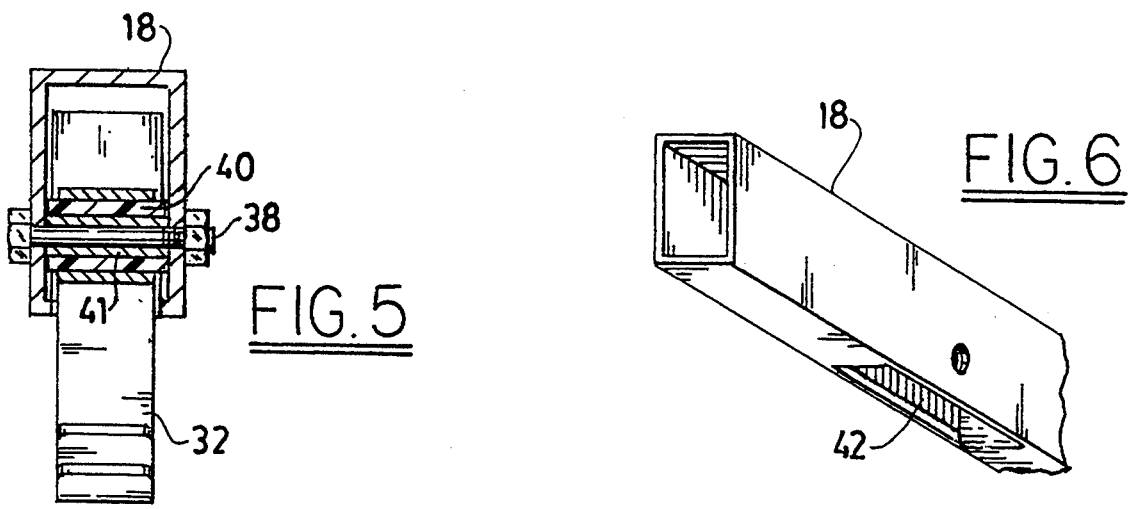
FIG. 5
FIG. 6
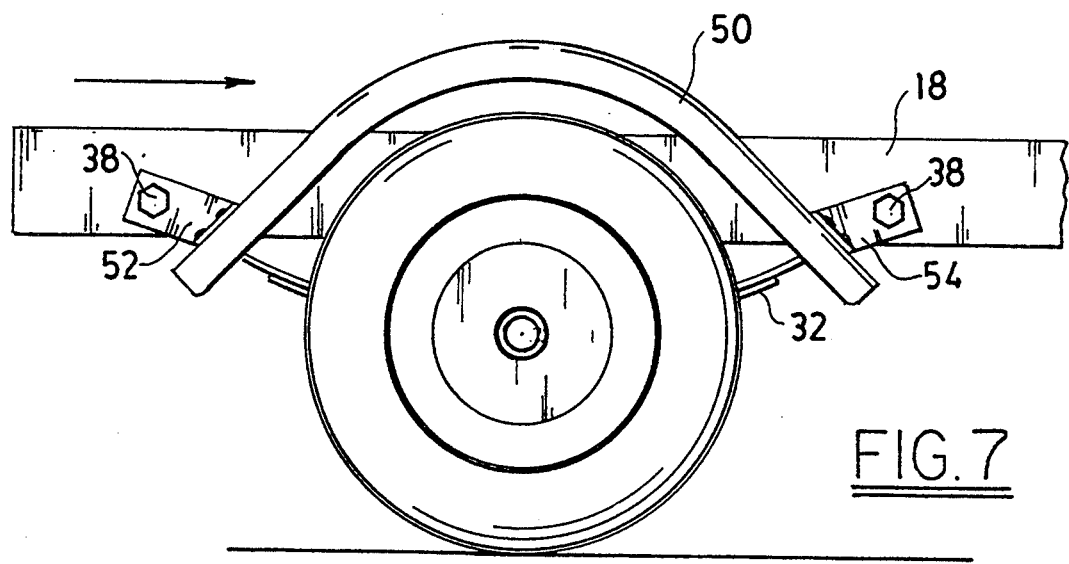
FIG. 7

SPRING HANGER ASSEMBLY FOR TRAILER FRAME

BACKGROUND OF THE INVENTION

1. Field of Invention

This invention relates in general to suspension systems for trailers and, in particular, to a hanger for a leaf spring having looped ends to be secured by the hanger within the interior of rectangular tubing forming the trailer frame.

2. Discussion of the Prior Art

Vehicle-towed trailers have typically employed leaf springs to suspend an axle from the trailer frame thereby providing the trailer with suspension and shock absorption. The prior art discloses a variety of arrangements for the mounting of such leaf springs relative to the trailer frame. For example, U.S. Pat. No. 3,540,756 issued to R. W. Stout et al. discloses a leaf spring wherein one end is carried within an open channel formed in the longitudinal frame member having a skirt portion flared outwardly to accommodate flexing of the spring. U.S. Pat. No. 3,177,005 issued to J. J. Duero et al. discloses a leaf spring wherein both ends of the spring are carried within a channel-shaped member opening outwardly and having reinforcing flanges where necessary. The C. Westergard patent, U.S. Pat. No. 1,354,082, does not disclose leaf spring ends being carried within a vehicle frame member, but does disclose a quarter-elliptic spring having one of its ends secured within a frame channel by a clamping plate. Two patents to H. B. Layman and K. W. Couse, U.S. Pat. Nos. 1,142,337 and 2,273,503, respectively, each disclose a leaf spring carried substantially within side frame members. The Layman patent discloses one end of the leaf spring carried within side base sections of the frame which are preferably channel-shaped and open downwardly except where they are closed at the bottom by plates. The springs disclosed in the Couse patent are positioned within supplemental channels formed in the side members. The channels open downwardly and are closed by flat plate members except over the length of the spring.

Although the prior art has contributed to the advancement of trailer frames designed to accommodate leaf springs, the prior art frames involve side members requiring complicated and expensive fabrication processes.

OBJECTS AND SUMMARY OF THE INVENTION

It is an object of the present invention to improve the suspension system of a trailer.

It is another object of the present invention to reduce the expense of fabrication of a trailer frame designed to accommodate leaf springs for axle suspension.

Still another object of the present invention is to enable a trailer frame to accommodate a leaf spring suspension system and fenders for each tire while minimizing the complexity in manufacturing and assembling of the frame, springs and fenders.

Yet a further object of the present invention is to utilize a basic trailer frame structure to support a leaf spring suspension system in an economical and simple manner.

These and other objects are attained in accordance with the present invention wherein there is provided a trailer frame comprised of a tongue which is connected to opposing longitudinal side frame members extending rearwardly from the tongue. The side frame members are formed from rectangular tubing having top, bottom and side surfaces. Cross bar members are positioned between the longitudinal side frame members to provide structural support to the frame.

An axle with a pair of spindles and bearings for mounting wheels and tires is also provided. A pair of fenders with mounting straps secured to the outer side surface of each of the side frame members provides cover for the top portion of each of the tires. A pair of leaf springs is provided to suspend the axle from the trailer frame. The center portion of each of the springs is mounted to one end of the axle by a U-bolt and retaining plate, and the end portions of each spring are mounted within the trailer side frame members.

A pair of openings, one of which is associated with one end of each spring, is formed in the bottom surface of each longitudinal side frame member to allow the end portions of the leaf springs to be positioned within the interior of the rectangular tubing forming the side frame members. These openings are sized large enough to permit only the end portions of the springs to be positioned within the tubing and to allow the spring to flex under operating conditions without hitting the bottom surface of the side frame member. Loops are formed at the ends of each leaf spring. Each of the forward loops is substantially closed in form and each of the rearward loops is open, substantially semi-circular in form to permit relative movement between the spring and an associated spring support bolt.

Two spring support bolts associated with each leaf spring are horizontally positioned through the side surfaces of the longitudinal side frame members above the openings. Each of the bolts support a nylon bushing and a steel spacer sleeve that are contained within the interior of the rectangular tubing forming the side frame members. The two bolts and bushings including the steel spacers are thus positioned through the loops formed at the ends of each leaf spring to support the ends of the spring within the interior of the tubing. The heads of the bolts also support the mounting straps of the fenders against the outer side surface of the side frame members.

BRIEF DESCRIPTION OF THE DRAWING

Further objects of the present invention, together with additional features contributing thereto and advantages accruing therefrom, will become apparent from the following description of a preferred embodiment of the invention which is shown in the accompanying drawing with like reference numerals indicating corresponding parts throughout, wherein:

FIG. 4 is a sectional view of the spring hanger taken along line 4—4 of FIG. 3;

FIG. 5 is a cross-sectional view taken along line 5—5 of FIG. 2;

FIG. 6 is a perspective view of an end portion of the side frame member of FIG. 2 broken away from the trailer frame; and FIG. 7 is a view similar to FIG. 2 showing a fender mounted on the side frame member and a wheel with a tire mounted on the trailer axle.

DETAILED DESCRIPTION OF A PREFERRED EMBODIMENT

Figure 1:
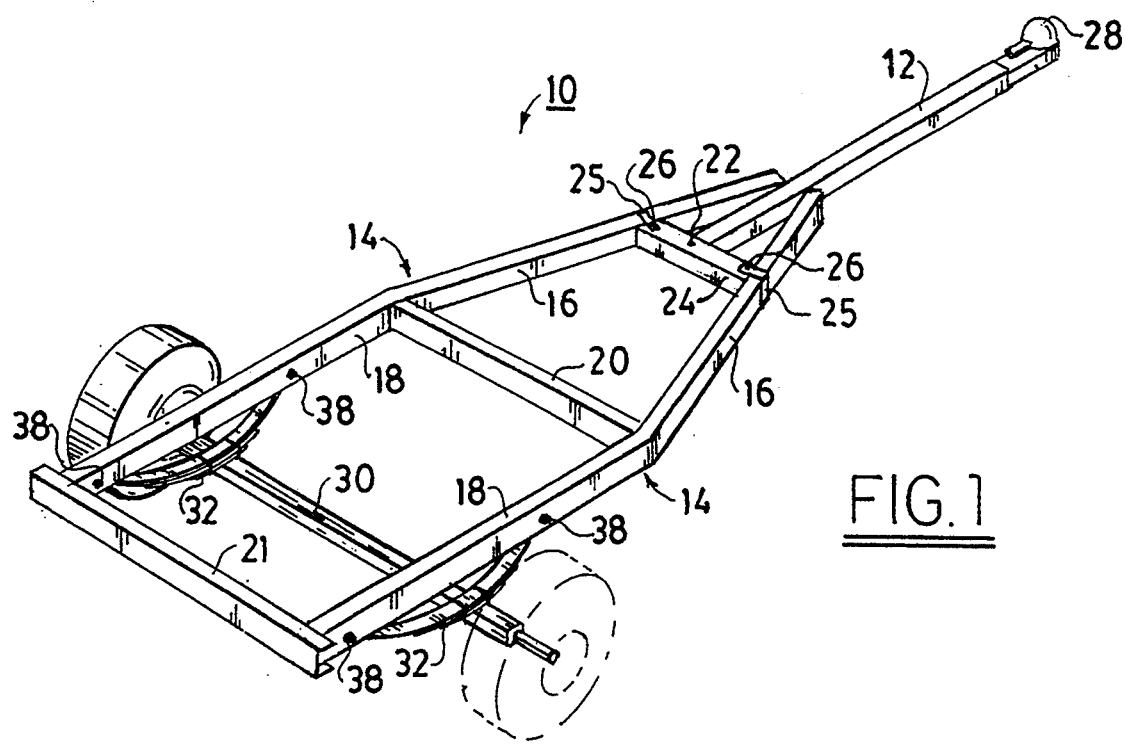
FIG. 1 is a perspective view of a trailer frame incorporating the spring hanger of the present invention.

Referring now to FIG. 1, there is shown a basic trailer frame structure 10. The frame 10 is composed of a tongue 12 and a pair of longitudinally extending side frame members or longitudinals 14. The side frame members each include a tongue section 16 and a parallel boat supporting section 18 joined by cross bar members 20 and 21. In the preferred embodiment of the present invention, the tongue 12 and side frame members 14 of the frame 10 are formed from rectangular metal tubing, while the cross bar members 20 and 21 are formed from C-shaped metal channel. The tongue 12 extends along a longitudinal center line of the trailer frame 10, with the trailing end secured by a bolt 22 to a short C-shaped yoke 24 which has its opposite ends secured by clamping straps 25 and bolts 26 adjacent the ends of the tongue sections 16. The forward end of the tongue 12 has mounted thereon a hitch coupler 28 for connection to a cooperating connecting element on a powered vehicle used for towing the trailer.

The trailer longitudinals 14 including the tongue sections 16 and the parallel boat supporting sections 18 are formed from one continuous length of rectangular metal tubing, the two sections 16 and 18 being defined by a bend along the length of the tubing. The opposite ends of the cross bar member 20 are fastened to the longitudinal side frame members 14 at a point just before the bend forming the tongue sections 16 as shown in FIG. 1. The C-shaped cross bar member 21 is secured to the rearward ends of the side frame members 14 by bolts or welding.

An axle 30 is secured to the trailer frame 10 by two leaf springs 32. Each leaf spring 32 is secured to the axle 30 by a pair of U-bolts 34 passing through a securing plate 36 on each side of the leaf springs, as shown in FIGS. 2, 3, and 4.

Figure 2:
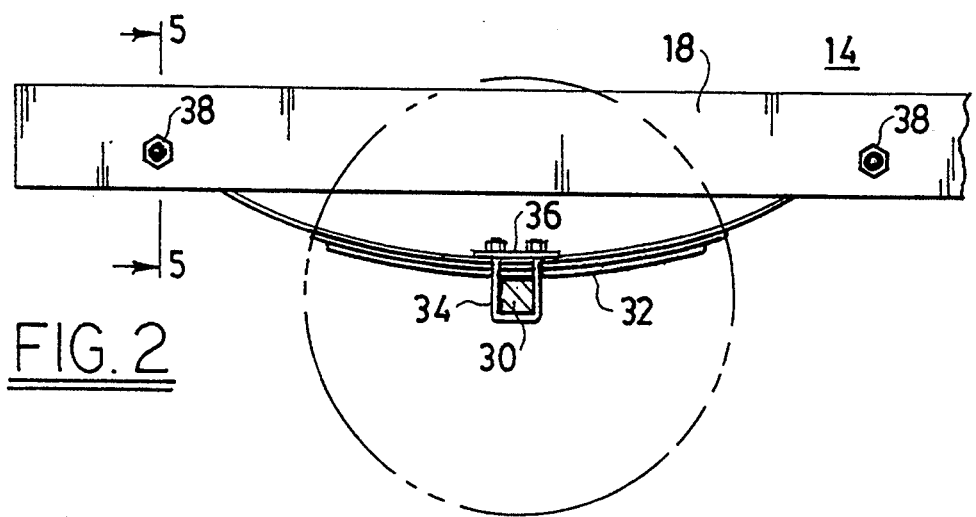
FIG. 2 is an elevational view of a side frame member of a trailer frame incorporating the spring hanger of the present invention.
Figure 3:
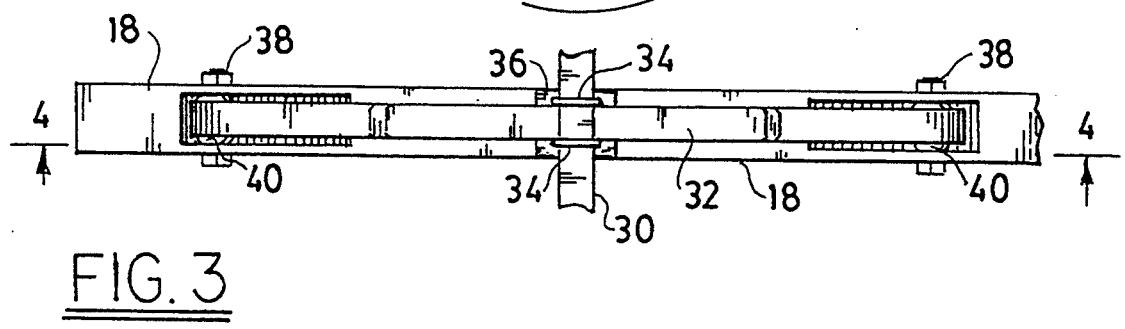
FIG. 3 is a bottom view of the side frame member of FIG. 2.

As best shown in FIGS. 2 and 3, a pair of spring hangers or bolts 38—38 pass through the side surfaces of the longitudinal side frame member 14 to secure the ends of springs 32 within the interior of the longitudinal as will be described in further detail hereinafter. As shown in FIG. 3, a pair of bushings 40—40 are supported by the bolts 38—38 within the interior of the side boom 14. FIG. 5 shows in further detail that the bushings 40—40 each rotate around a steel sleeve or spacer 41 rather than around the shank of the bolts 38—38. As each bolt 38 is tightened, the spacer 41 is pinched or clamped between the side surfaces of the longitudinals 14. In this manner, the bolt 38 and corresponding spacer 41 are rigidly fixed relative to the longitudinals 14, thus allowing the bushing 40 to freely rotate around the spacer.

Referring now to FIGS. 4–6, there is shown the right-hand side of the spring hanger assembly contained within the side frame members 14. FIGS. 4–6 also represent similar elements and structure for the left-hand side of the spring hanger but, for convenience of illustration, only one side need be described as both sides are the same. Provided on the bottom surface of the parallel boat supporting section 18 of the side frame member 14 is a pair of access holes or openings 42—42. The openings 42—42 are formed by cutting the bottom surface of the longitudinal 14 and bending a tab portion 44 into the interior of the longitudinal as shown in FIG. 4. Alternatively, the openings 42—42 may be formed by simply cutting a rectangular section out from the bottom surface of the longitudinal. The openings 42—42 are sized large enough to allow the ends of spring 32 to be placed within the interior of the longitudinal and to allow the spring to flex during towing of the trailer without hitting the bottom surface remaining between the openings.

The spring 32 is provided with an open loop 46 and closed loop 48 formed in the longest leaf of the spring. In the preferred embodiment, the leaf springs 32 have three leaves each which provide sufficient suspension and shock absorption for the intended load. A variety of leaf springs and leaf spring configurations, however, may be used without departing from the spirit of the present invention. The open loop 46 is positioned rearward with respect to the closed loop 48 as defined by the arrow indicating the forward direction of travel. The closed loop 48 is substantially circular in form and wraps snugly around one of the bushings 40'40 provided on the forward bolt 38 and spacer 41. The open loop 46 is substantially semi-circular in form and similarly wraps around the rearward bushing 40 that is supported by bolt 38 and spacer 41, as described above. During the towing of a load on the trailer, the springs are flexed and the bushings 40—40 allow the loops 46 and 48 to move relative to the bolts 38—38 thereby providing shock absorption for the trailer frame 10. In particular, closed loop 48 will oscillate between partial rotational movement and open loop 46 will similarly oscillate while also moving back and forth in a substantially linear manner.

Referring now to FIG. 7 there is shown the rear portion of the right side of the trailer frame 10 which also represents similar elements and structure for the left side of the trailer. Shown in FIG. 7 is a fender 50 having two mounting straps 52 and 54. The straps 52 and 54 are riveted or welded to the fender 50 to allow the fender 50 to be secured to the outer side surface of the longitudinal 14 by the spring hanger bolts 38—38. Thus, the spring hanger bolts 38—38 serve the dual function of supporting the bushings 40—40, the spacer sleeves 41, and the spring loops 46 and 48 within the frame 10, as well as mounting the fenders 50 to the side frame members 14.

While this invention has been explained with reference to a preferred embodiment, it should be appreciated that the invention is not limited to that precise embodiment. Rather, many modifications and variations would present themselves to those of skill in the art without departing from the scope and spirit of this invention, as defined in the following claims:

What is claimed is:

1. In a trailer of the type having a tongue for towing, a pair of longitudinal side frame members extending rearwardly from the tongue and formed of tubing having a top, bottom and side surfaces, cross bar members positioned between the side frame members, a wheel bearing axle supporting the trailer for movement over a roadway, fenders for partially covering a portion of each wheel and leaf springs for connecting the wheel bearing axle to the trailer, the center portion of the springs being connected to the axle and the end portions of each spring being connected to the trailer side frame members to provide movement for the axle relative to the trailer, the improvement comprising:

a pair of openings formed in the bottom surface of each longitudinal side frame member to allow the end portions of the leaf springs to be positioned within the interior of the tubing forming the side frame members;

a loop formed at each end of each leaf spring, one loop being substantially closed and the other loop being substantially open; and spring hanger means for connecting the springs to the trailer, said spring hanger means being substantially contained within the interior of the tubing forming the side frame members.

2. The trailer according to claim 1 wherein said spring hanger means includes a pair of bolts associated with each leaf spring, each of said bolts being horizontally positioned through the side surfaces of the longitudinal side frame members above said openings, and passing through one of the loops formed at the ends of each leaf spring to support said end within the interior of the tubing of the side frame members.

3. The trailer according to claim 1 wherein each fender further includes a pair of mounting straps that are secured to the outer side surface of each longitudinal side frame member by said spring hanger means.

4. The trailer according to claim 2 wherein each of said bolts further includes a bushing and a spacer being supported within the interior of the tubing forming the side frame members to allow the loops of the springs to move relative to said bolts.

5. In a trailer of the type having a tongue for towing, a pair of longitudinal side frame members extending rearwardly from the tongue and formed of tubing having a top, bottom and side surfaces, cross bar members positioned between the side frame members, a wheel bearing axle supporting the trailer for movement over a roadway, fenders for partially covering a portion of each wheel and leaf springs for connecting the wheel bearing axle to the trailer, the center portion of the springs being connected to the axle and the end portions of each spring being connected to the trailer side frame members to provide movement for the axle relative to the trailer, the improvement comprising:

a pair of openings formed in the bottom surface of each longitudinal side frame member to allow the end portions of the leaf springs to be positioned within the interior of the tubing forming the side frame members;

a loop formed at each end of each leaf spring, one loop being substantially closed and the other loop being substantially open;

spring hanger means for connecting the springs to the trailer, said spring hanger means being substantially contained within the interior of the tubing forming the side frame members; and a pair of mounting straps connected to each fender, each of the straps being secured to the outer side surface of the longitudinal side frame members by said spring hanger means.

6. The trailer according to claim 5 wherein said spring hanger means includes a pair of bolts associated with each leaf spring, each of said bolts being horizontally positioned through the side surfaces of the longitudinal side frame members above said openings, thereby passing through one of each of the fender straps and one of the loops formed at the ends of each leaf spring whereby the fender is supported against the outer side surface of the side frame member while the spring end is supported within the interior of the tubing of the side frame members.

7. The trailer according to claim 6 wherein each of said bolts further includes a bushing and a spacer being supported within the interior of the tubing forming the side frame members to allow the loops of the springs to move relative to said bolts.

* * * * *